United States Patent
Yamada

(10) Patent No.: US 6,596,666 B1
(45) Date of Patent: Jul. 22, 2003

(54) HONEYCOMB STRUCTURE

(75) Inventor: Toshio Yamada, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/710,908

(22) Filed: Nov. 14, 2000

(30) Foreign Application Priority Data

Nov. 15, 1999 (JP) .......................................... 11-324596

(51) Int. Cl.$^7$ ........................... B01J 23/40; B01J 23/42; B01J 23/44; B01J 23/00; B01J 23/08
(52) U.S. Cl. ..................... 502/327; 502/333; 502/334; 502/339; 502/355; 502/415; 502/439; 502/527.21
(58) Field of Search ........................... 502/439, 527.19, 502/527.21, 407, 415, 333, 334, 339, 326, 327; 428/118, 116; 423/215.5

(56) References Cited

U.S. PATENT DOCUMENTS

| | | | |
|---|---|---|---|
| 4,001,028 A | * 1/1977 | Frost et al. | 106/62 |
| 4,233,187 A | * 11/1980 | Atwood et al. | 252/466 J |
| 4,407,785 A | * 10/1983 | Pfefferle | 423/659 |
| 4,421,702 A | * 12/1983 | Oda et al. | 264/62 |
| 4,489,774 A | * 12/1984 | Ogawa et al. | 165/10 |
| 4,856,577 A | * 8/1989 | Katsu et al. | 165/8 |
| 4,859,642 A | * 8/1989 | Hoelderich et al. | 502/2 |
| 4,869,944 A | * 9/1989 | Harada et al. | 428/116 |
| 4,877,670 A | * 10/1989 | Hamanaka | 428/116 |
| 5,128,306 A | * 7/1992 | Dettling et al. | 502/304 |
| 5,130,109 A | * 7/1992 | Wan | 423/213.2 |
| 5,378,142 A | * 1/1995 | Kennelly et al. | 431/7 |
| 5,455,097 A | * 10/1995 | Machida et al. | 428/116 |
| 5,494,881 A | * 2/1996 | Machida et al. | 502/439 |
| 5,720,787 A | * 2/1998 | Kasai et al. | 55/282 |
| 5,866,079 A | * 2/1999 | Machida et al. | 422/179 |
| 5,914,187 A | 6/1999 | Naruse et al. | 428/327 |

FOREIGN PATENT DOCUMENTS

| | | |
|---|---|---|
| JP | 63-178130 | 11/1988 |
| JP | 5-317727 | 3/1993 |
| JP | 08-028246 | 1/1996 |
| JP | 9-155204 | 6/1997 |
| JP | 11-291403 | 10/1999 |

* cited by examiner

Primary Examiner—Stanley S. Silverman
Assistant Examiner—Cam N. Nguyen
(74) Attorney, Agent, or Firm—Parkhurst & Wendel, L.L.P.

(57) ABSTRACT

A honeycomb structure includes multiple honeycomb segments joined by means of a bonding material. Each of the honeycomb segments has a plurality of passages which are defined by partition walls and extend in an axial direction, Flatness of outer walls to be joining planes of the honeycomb segments is 0.2 mm or more. The honeycomb structure is superior in durability, by which a honeycomb segment does not shift due to vibration or exhaust back pressure in use.

9 Claims, 1 Drawing Sheet

HONEYCOMB STRUCTURE

BACKGROUND OF THE INVENTION AND RELATED ART STATEMENT

The present invention relates to a honeycomb structure for carrying a catalyst to be used in an exhaust gas purification device of heat engines such as internal combustion engines or the like or a combustion device such as boilers or the like, or in a reforming device for liquid fuel or gaseous fuel, or a honeycomb structure used as a filter.

The honeycomb structure carrying a catalyst component has conventionally been used in an exhaust gas purification device of heat engines such as internal combustion engines or reforming devices for liquid fuel or gaseous fuel. In addition, it is known that a honeycomb structure is used as a filter for trapping a particulate matter contained in dusty fluid such as exhaust gas from a diesel engine.

Such a honeycomb structure is exposed to a rapid temperature change and local generation of heat due to exhaust gas, and non-uniform temperature distribution inside is easy to be caused, thereby causing a problem of having a crack. In order to solve such a problem, there has been proposed a method to relieve thermal stress to act on a structure by unitarily joining plural honeycomb segments with an elastic bonding material to form an integrated honeycomb structure.

However, when multiple honeycomb segments are joined to be used as one honeycomb structure, because the outer walls to be joining planes of a honeycomb segment was smooth conventionally, joining strength was weak and the joining of honeycomb segments became loose or disjointed due to vibration or exhaust back pressure in use, and sometimes a honeycomb segment shifted or fell to pieces.

SUMMARY OF THE INVENTION

The present invention has been made in view of such conventional circumstances and aims to provide a honeycomb structure excellent in durability by which honeycomb segments do not move due to vibration or exhaust back pressure in use.

According to the present invention, there is provided a honeycomb structure comprising multiple honeycomb segments joined by means of a bonding material, each of the honeycomb segments having a plurality of passages which are defined by partition walls and extend in an axial direction, wherein flatness of outer walls to be joining planes of the honeycomb segments is 0.2 mm or more.

In the present invention, "outer walls to be joining planes" means planes of each outer wall to be jointed with a bonding material except for a corner part including a rounded corner. In addition, "flatness" is as defined by JISB0621-1984.

DETAILED DESCRIPTION OF THE PREFERRED EMBODIMENTS

Figure 1A:
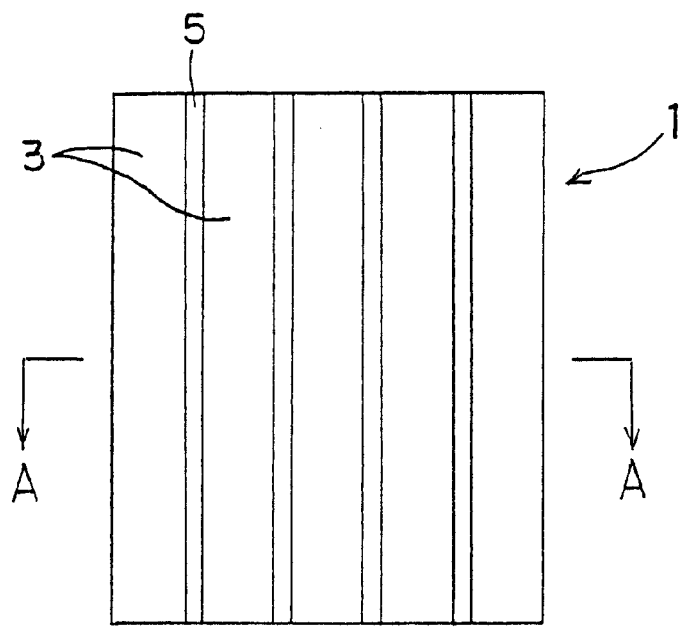
FIG. 1(*a*) is a side elevation showing one example of an embodiment of a honeycomb structure of the present invention, and FIG. 1(*b*) is an A—A sectional view thereof.

FIG. 1(*a*) is a side elevation showing one example of an embodiment of a honeycomb structure of the present invention, and FIG. 1(*b*) is an A—A sectional view thereof.

As shown in these figures, in the honeycomb structure 1 of the present invention, multiple honeycomb segments 3 each having a lot of passages (cell passageways) which extend in an axial direction and are defined by partition walls are joined by means of a bonding material 5.

In addition, as the constitution peculiar to the present invention, joining strength between honeycomb segments is raised by setting flatness of outer walls to be joining planes of the honeycomb segments 3 to be a predetermined value or more to prevent honeycomb segments from shifting or falling to pieces caused by being shifted due to vibration or exhaust back pressure in use. In other words, if there are moderate unevenness and undulation on outer walls, joining planes are hard to come off; and even if one came off, an individual honeycomb segment is hard to be shifted, which gives a honeycomb structure superior in durability.

Specifically, flatness of outer walls to be joining planes of the honeycomb segments 3 is set to be 0.2 mm or more. If the flatness of the outer walls is less than 0.2 mm, it is inferior in durability as a honeycomb structure because sufficient joining strength is hardly obtained, and honeycomb segments are easily shifted. Incidentally, when flatness of outer walls is increased too much, thickness of the bonding material 5 among the honeycomb segments 3 increases with it, and a flow path area (an aperture rate) of the honeycomb structure 1 decreases, which is not practical. Therefore, it is desirable that flatness of the outer walls to be joining planes of the honeycomb segments 3 is 1.5 mm or less.

In addition, a problem of shift of a honeycomb segment due to vibration or exhaust back pressure in use of a honeycomb structure is easily caused in a honeycomb structure composed with relatively big honeycomb segments having such a size that a cross-section perpendicular to the axial direction of passages of a honeycomb segment can include a circle having a diameter of 25 mm (it protrudes from the circle of a diameter of 25 mm) and is hardly caused in a honeycomb structure composed with the relatively small honeycomb segments having the aforementioned cross-section which can fit into inside of a circle having a diameter of 25 mm. Therefore, the present invention is preferably used for a honeycomb structure composed with relatively big honeycomb segments such as described above.

In the present invention, it is preferable that the honeycomb segments 3 have as the main crystal phase one kind selected from the group consisting of cordierite, SiC, SiN, alumina, mullite and lithium-aluminum silicate(LAS) in view of strength, heat resistance, etc., and SiC, whose thermal conductivity is high, is particularly preferred in respect of easy heat-radiation. As a method to give desired flatness to outer walls to be joining planes of the honeycomb segments 3, there may be employed a method in which a board having unevenness is pressed against the outer walls to be joining planes after molding of a honeycomb segment or a method in which unevenness is provided to outer walls by means of grinding or the like after firing.

A preferable cell density of the honeycomb segments 3 is 6–2000 cell/square inch (0.9–310 cell/cm$^2$). When the cell density is less than 6 cell/square inch (0.9 cell/cm$^2$), strength as a honeycomb segment and available GSA (geometric surface area) are lacked. When the cell density exceeds 2000 cell/square inch (310 cell/cm$^2$), pressure loss when gas flows increases.

It is preferable that each partition wall of the honeycomb segments 3 has a thickness of 50–2000 μm. When the thickness of each partition wall is less than 50 μm, strength as a honeycomb segment is short. When the thickness of each partition wall exceeds 2000 μm, available GSA of a honeycomb segment falls, and pressure loss when gas flows increases. In addition, it is preferable that a cross-section (cell shape) of a passage of the honeycomb segments 3 is triangular, quadranglar or hexagonal from a viewpoint of production.

As a bonding material 5 to join the honeycomb segments 3, it is preferable to use ceramic fiber; having thermal resistance, ceramic powder, cement or the like individually or in the form of a mixture thereof. If an organic binder, an inorganic binder or the like is further mixed in the material as necessary to be used, joining function preferably improves.

When a honeycomb structure of the present invention is to be used in purification of exhaust gas from a heat engines such as an internal combustion engine or in reforming of liquid fuel or gaseous fuel as a catalyst carrier, metal having catalytic ability is made to be carried to the honeycomb segments. Representative metals having catalytic ability are Pt, Pd, and Rh, and it is preferable that at least one of these is carried on a honeycomb segment.

On the other hand, when a honeycomb structure of the present invention is to be used as a filter such as a particulate filter for a diesel engine to trap a particulate matter contained in dusty fluid, an individual honeycomb segment has such a structure that partition walls of passages have filtration ability, an end of predetermined passages is sealed, and the other end of the rest of the passages is sealed.

When dusty fluid is sent to a honeycomb structure composed with such honeycomb segments from an end surface of the honeycomb structure, the dusty fluid flows into the honeycomb structure from the passages which are not sealed at the end of the end surface side, passes through porous partition walls having filtration ability, and enters the other passages which are not sealed at the end of the other end surface side of the honeycomb structure. When the dusty fluid passes the partition walls, particulate matter in the dusty fluid is captured by the partition walls, and purified fluid from which a particulate material is removed is discharged from the other end surface of the honeycomb structure.

Because clogging is caused, and a function as a filter falls when captured particulate materials accumulate on the partition walls, the particulate matter is regularly removed by combustion by heating the honeycomb structure with a heating means such as a heater to revitalize the filter function. In order to promote the combustion of particulate matter during this revitalization, the honeycomb segments may be made to carry a metal having catalytic ability as described above.

The present invention is hereinbelow described in more detail on the basis of examples. However, the present invention is by no means limited to these examples.

EXAMPLE 1

There were prepared eight kinds of SiC honeycomb segments each having dimensions of 30 mm×30 mm×150 mm (length), thickness of each partition wall of 0.3 mm, cell density of 31 cell/cm$^2$, and a flatness of the outer walls to be joining planes of 0.05 mm, 0.1 mm, 0.15 mm, 0.2 mm, 0.3 mm, 0.6 mm, 1 mm or 1.5 mm. Each of the desired flatnesses was given to the honeycomb structure except for the one having a flatness of 0.05 mm by pressing a board having unevenness against the outer walls to be joining planes after molding.

Figure 1B:
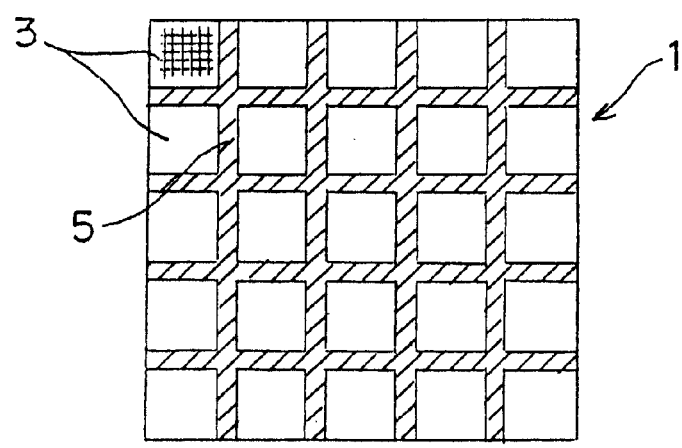

The honeycomb segments having each of eight kinds of flatnesses were arranged into 5×5 (25 in total) of honeycomb segments as in FIG. 1(b) and joined with a bonding material prepared by mixing colloidal silica and alumina fiber with water. The thickness of a bonding material in a joint was 1.5–3 mm (a little variance depending on flatness). After the joining, honeycomb structures having a sectional diameter of 150 mm were obtained by grinding the circumference.

A ceramic non-intumescent mat was wound round each of these honeycomb structures as a holding material, and each of the honeycomb structures was pushed into a can for canning made of SUS409 to obtain a canning structure, which was then subjected to a heat-vibration test. Conditions of the test were inlet gas temperature of 900° C., vibration acceleration of 50 G, and vibration frequency of 200 Hz with vibration being given in the axial direction of a honeycomb structure while the heated exhaust gas was sent to the canning structure. An individual honeycomb segment was measured for shift every 20–50 hours and as evaluation (○) was given to the one having a shift of 0.5 mm or less as usable, (Δ) was given to the one having a shift of 0.5–1 mm as requiring care, and (X) was given to the one having a shift of 1 mm or more as unusable.

The results of the test are shown in the following table 1. As for the honeycomb structures made of the honeycomb segments having flatness of outer walls to be joining planes of 0.2 mm or more, shifting of an individual honeycomb segment was hardly found even after 200 hours of test, and high durability was shown.

TABLE 1

| Test time | Flatness of joining planes (mm) | | | | | | | |
|---|---|---|---|---|---|---|---|---|
| (hours) | 0.05 | 0.1 | 0.15 | 0.2 | 0.3 | 0.6 | 1 | 1.5 |
| 20 | Δ | ○ | ○ | ○ | ○ | ○ | ○ | ○ |
| 40 | Δ | ○ | ○ | ○ | ○ | ○ | ○ | ○ |
| 60 | X | Δ | ○ | ○ | ○ | ○ | ○ | ○ |
| 80 |  | Δ | ○ | ○ | ○ | ○ | ○ | ○ |
| 100 |  | X | Δ | ○ | ○ | ○ | ○ | ○ |
| 150 |  |  | X | ○ | ○ | ○ | ○ | ○ |
| 200 |  |  |  | ○ | ○ | ○ | ○ | ○ |

EXAMPLE 2

Honeycomb segments same as example 1 except for the dimensions of 60 mm×90 mm×200 mm(length) were arranged into vertically 5×horizontally 4 (20 in total) of the honeycomb segments in view from the side of an end surface and joined in the same manner as in example 1 to produce a honeycomb structure of about 306 mm×about 364.5 mm×200 mm(length). After making this into a quadranglar canning structure, the canning structure was subjected to the same heat-vibration test as in example 1, and the same results as in example 1 were obtained.

As discussed above the honeycomb structure of the present invention was superior in durability because the individual honeycomb segment which composes the honeycomb structure does not easily shift due to vibration or exhaust back pressure in use.

What is claimed is:

1. A honeycomb structure comprising multiple honeycomb segments joined by means of a bonding material, each of the honeycomb segments having a plurality of passages which are defined by partition walls and extend in an axial direction, wherein flatness of outer walls to be joining planes of said honeycomb segments is 0.2 mm or more.

2. A honeycomb structure according to claim 1, wherein said flatness of the outer walls to be joining planes of said honeycomb segments is 1.5 mm or less.

3. A honeycomb structure according to claim 1, wherein said honeycomb segments have such a size that a cross-section perpendicular to the axial direction of said passages of said honeycomb segments includes a circle having a diameter of 25 mm.

4. A honeycomb structure according to claim 1, wherein said honeycomb segments contain as a main crystal phase one component selected from the group consisting of cordierite, SiC, SiN, alumina, mullite and lithium-aluminum silicate(LAS).

5. A honeycomb structure according to claim 1, wherein metal having catalytic ability is carried on said honeycomb segments to be used for purification of exhaust gas from an internal combustion engine or for reforming of liquid fuel or gaseous fuel.

6. A honeycomb structure according to claim 5, wherein said metal having catalytic ability is at least one selected from the group consisting of Pt, Pd and Rh.

7. A honeycomb structure according to claim 1, wherein said cross-section of the passages of the honeycomb segments is triangular, quadranglar or hexagonal.

8. A honeycomb structure according to claim 1, wherein each of said honeycomb segments has a structure that said partition walls of said passages have filtration ability and one end of each of predetermined passages is sealed and the other end of each of the rest of said passages is sealed.

9. A honeycomb structure according to claim 8, wherein the honeycomb structure is used as a filter for trapping a particulate matter contained in dusty fluid.

* * * * *